United States Patent Office 2,748,172
Patented May 29, 1956

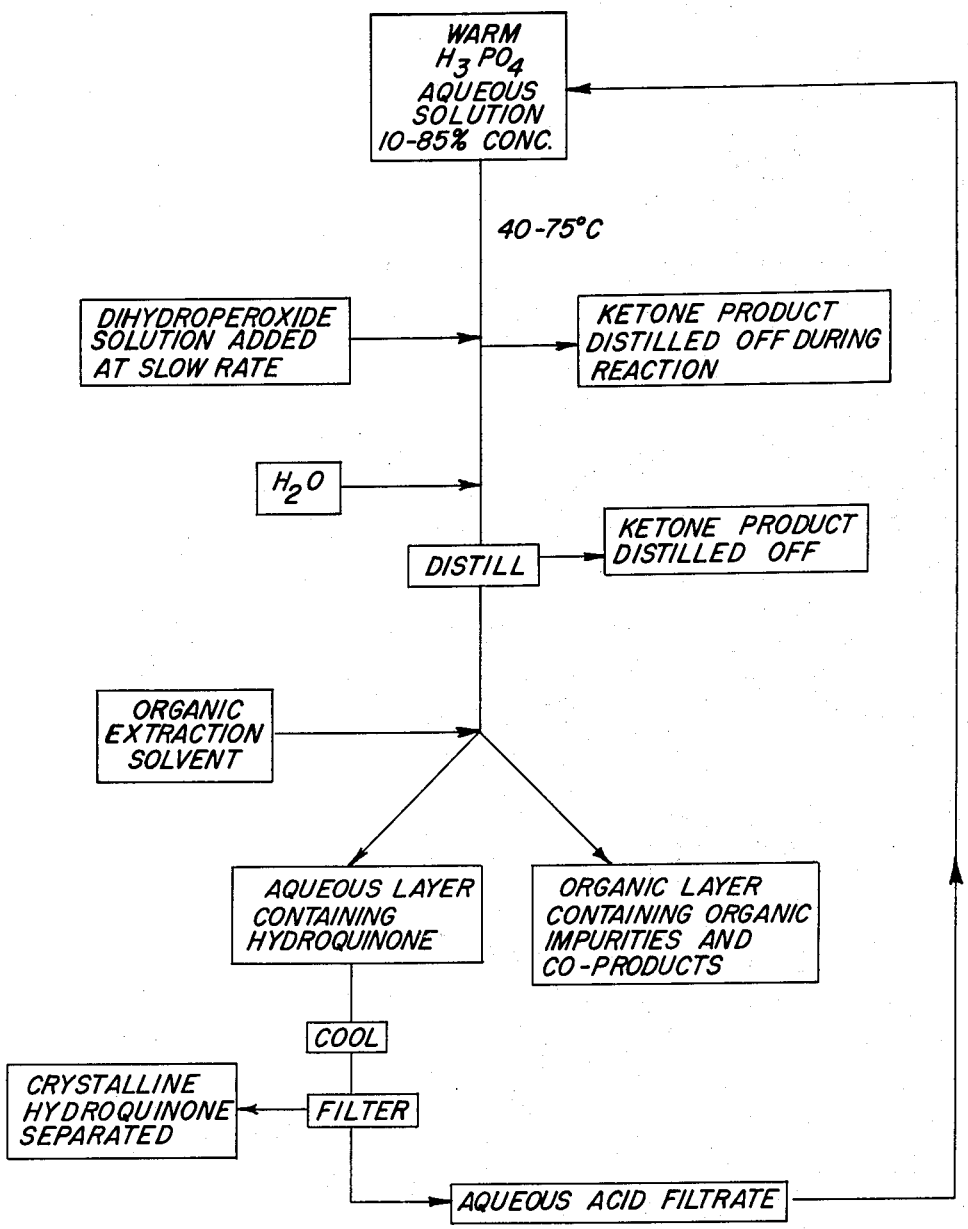

2,748,172

PREPARATION OF HYDROQUINONE

George F. Rodgers, Kingsport, Tenn., assignor to Eastman Kodak Company, Rochester, N. Y., a corporation of New Jersey Application September 18, 1952, Serial No. 310,369

12 Claims. (Cl. 260—621)

This invention relates to a new and improved method for the preparation of hydroquinone phenols by decomposition of dialkyl benzene hydroperoxides, the alkyl groups of which are attached to the benzene by a tertiary carbon atom. It relates particularly to the preparation of hydroquinone and low molecular weight ketones by decomposition of para-di-isopropyl and para-disecondary-butyl benzene dihydroperoxides.

It is well known that alkyl benzene hydroperoxides are decomposed by acids in an ionic reaction to give phenols and carbonyl compounds. Kharasch suggests perchloric or sulfuric acid, and ferric chloride, aluminum chloride, etc. in non-aqueous media (Kharasch, Fono, and Nudenberg, J. Org. Chemistry 15, 748–752, 1950).

Numerous patents disclose the use of various concentrations of sulfuric acid at many temperatures to bring about the decomposition to phenols, and specifically the decomposition of cumene hydroperoxide to phenol. However, these patented processes for making phenol and alkyl substituted phenols are of little help in the present instance where hydroquinone is the desired product, as certain difficulties are involved, particularly in isolating the product, which do not apply in making phenol.

A comparison of some of the properties of hydroquinone with those of phenol and its alkyl derivatives will show quite clearly that processes for isolation of phenols are usually not applicable to the isolation of hydroquinone.

| Hydroquinone | Alkylated Phenols |
| --- | --- |
| Soluble in water. | Insoluble in water. |
| Insoluble in hot aromatic solvents. | Infinitely soluble in aromatic solvents. |
| High boiling point. | Relatively low boiling point. |
| Readily oxidized—even by peroxides. | Not readily oxidized. |
| Decomposed by air in presence of alkali. | Relatively stable in alkali. |

From the above properties I have determined that the preferable conditions necessary to obtain hydroquinone from the hydroperoxides should include the following:

1. The decomposition medium should be one in which hydroquinone is soluble and from which it can be crystallized e. g. an aqueous medium.

2. The peroxide should be decomposed rapidly to prevent oxidation.

3. The catalyst should have different solubility characteristics than hydroquinone.

One foreign patent discloses the conversion of a,a,a',a',-tetramethyl-p-xylylene dihydroperoxide into hydroquinone by means of acid treated bentonite, and the patent discloses that phosphoric acid supported on alumina can be used. Another describes preparation of a hydroquinone product from di-isopropyl benzene hydroperoxide agitated and heated with 20% H₂SO₄. These prior art processes are, however, subject to disadvantages which drastically reduce their commercial utility. In the first mentioned foreign patent, after heating for 8½ hours, only 84.8% of the dihydroperoxide was decomposed, and only a 65% yield of hydroquinone was obtained upon distillation of the mixture. For commercial operation a higher yield is desirable. The use of sulfuric acid as described in the prior art provides undesirable charring.

I have found that by using aqueous phosphoric acid, particularly in a certain preferred range of concentrations, the commercial manufacture of hydroquinone from the p-di-isopropyl and p-disecondarybutyl benzene hydroperoxides is rendered feasible for the first time. The aqueous phosphoric acid used in my invention dissolves about 15–20% hydroquinone at 80° C. and only about 3% at 5° C. Hydroquinone crystallizes readily and in quite pure condition from the acid, and the acid causes the peroxide to decompose almost instantaneously. Hydroquinone is obtained in excellent yields of 86–95% by this method, showing the outstanding nature of the results using the process disclosed for the first time herein. My process also provides valuable by-products which are readily recovered for sale or reuse.

A process such as that outlined in another foreign patent, using acid treated bentonite, if applied to a suitable dihydroperoxide, would produce hydroquinone, which because of its insolubility in benzene, would be obtained as a mixture with the catalyst. Additional operations would therefore be required to separate the hydroquinone from the catalyst.

I have found that any dihydroperoxide remaining in the reaction mixture will be isolated in admixture with the hydroquinone. Since peroxides oxidize hydroquinone to quinone, they must be completely absent from the product or it will be highly colored. Therefore the slow reaction using acid treated bentonite as described in the above mentioned foreign patent would be expected to result in the oxidation of the product during the reaction.

The supported phosphoric acid catalyst mentioned in the foreign art, if used under the conditions specified therefor would probably cause a much more rapid and complete reaction than the acid treated bentonite, but the difficulty of separating the catalyst and product still applies.

In other foreign art is found reference to a process using sulfuric acid in acetone and distillation separation of the product. If applied to the pure dihydroperoxides of di-isopropylbenzene, this process might produce a good yield of hydroquinone, but distillation is not favored as a means of separation of hydroquinone, crystallization from liquid being greatly preferred.

Accordingly, an important object of the invention is to provide a method whereby hydroquinone of good quality can be prepared in commercially practical yields by decomposition of dialkyl benzene dihydroperoxides such as p-di-isopropyl and p-disecondary butyl benzene dihydroperoxides. A further object is to accomplish this by use of aqueous phosphoric acid in a certain critical range of concentrations. It is also an object of this invention to provide by-products produced in the reaction which are readily recovered for sale or re-use. Other objects will appear hereinafter.

According to my invention I prepare hydroquinone from the air oxidation products of p-dialkyl benzenes with good yields, and by a process which is free of the troublesome charring effects which occur with sulfuric acid catalysts and which requires a minimum of separatory steps. The catalyst can be recovered after removal of the reaction products and re-used without purification, thus materially reducing catalyst cost, and also reducing the loss of the hydroquinone dissolved in the catalyst.

My invention consists of the addition of a dialkyl benzene dihydroperoxide either alone or dissolved in a solvent such as acetone, or dissolved in the oxidation reaction mixture, to a dilute phosphoric acid solution at somewhat elevated temperatures, whereby the hydroperoxide groups present are decomposed to phenolic hydroxyls and carbonyl compounds. The preferred range of concentration of $H_3PO_4$ expressed as grams per 100 grams of aqueous acid lies between 10–20 and 85, preferably about 60. Concentrated (85%) $H_3PO_4$ may be used in the process to produce acceptable hydroquinone, although the amount of hydroquinone which may be produced per batch is somewhat smaller, due to reduced solubility of the product in the concentrated acid. The carbonyl compounds may be removed continuously by distillation during the reaction, or batchwise at the end of the addition of the dihydroperoxide solution. The solvents may be removed at this time by distillation or steam distillation or, if the solvent is aromatic (in which hydroquinone is insoluble), it may be removed by extraction. The extraction method is to be preferred, since by this method any monohydric phenols formed from monohydroperoxides present in the original reaction mixture are preferentially separated from the hydroquinone, which remains dissolved in the catalyst layer. The phenolic materials can be used in the preparation of special compositions of phenol formaldehyde resins. The recovered solvents and dialkyl benzenes can of course be reused in the process. If the amount of hydroquinone formed is 10–17% of the weight of the catalyst used, the aromatic solvent extraction step should be carried out hot. The hydroquinone then separates from the cooled catalyst solution. There are other well known methods for the separation of hydroquinone from the solvents and phenols expected to be present in the reaction mixtures, and the operation of my invention is not limited to any of these methods. The method of separation of products would be determined by consideration of the properties of the products from the particular dialkyl benzene dihydroperoxide and solvent combination used.

EXAMPLES OF THE INVENTION

Example 1

The use of 42.5% phosphoric acid with the dihydroperoxide of di-isopropyl benzene.

MATERIALS

| | |
|---|---|
| Phosphoric acid (85%) _____gms__ | 50 |
| Water _____gms__ | 50 |
| Crude di-isopropyl benzene dihydroperoxide containing 17.25 gms. of the peroxide _____gms__ | 20 |
| Acetone _____cc__ | 65 |

PROCEDURE

The water was mixed with the acid and the solution warmed to 70° C. The dihydroperoxide was dissolved in the acetone, and the mixture added dropwise to the warm acid over a one hour period. The mixture was stirred for 15 minutes after addition was complete. One hundred and fifty ml. of water was then added and the temperature raised slowly until the vapor temperature reached 95° C. The aqueous distillate then contained all the acetone. The acid was extracted with 100 cc. of warm benzene, and the layers separated. The aqueous phase was found to contain 7.77 grams of hydroquinone (92% yield), by ceric sulfate analysis.

Example 2

The use of 21% $H_3PO_4$ with the dihydroperoxide of di-isopropyl benzene.

MATERIALS

| | |
|---|---|
| Phosphoric acid (85%) _____gms__ | 25 |
| Water _____gms__ | 75 |
| Crude di-isopropyl benzene dihydroperoxide containing 17.8 gms. of the peroxide _____gms__ | 20 |
| Acetone _____cc__ | 65 |

PROCEDURE

This experiment was carried out exactly like Example 1. The acid layer was found to contain 7.55 gms. (87.5%) of hydroquinone.

Example 3

The use of 85% $H_3PO_4$ with the dihydroperoxide of di-isopropyl benzene.

MATERIALS

| | |
|---|---|
| Phosphoric acid (85%) _____gms__ | 100 |
| Crude p-di-isopropyl benzene dihydroperoxide containing 17.25 gms. of dihydroperoxide ____gms__ | 20 |
| Acetone _____cc__ | 65 |
| Benzene _____cc__ | 100 |

PROCEDURE

The acid was warmed to 40° C., and the dihydroperoxide dissolved in the acetone was added dropwise in one hour. After fifteen minutes at 40° C., 150 cc. of water was added, and the temperature was slowly raised until the vapor temperature was 95° C. to insure complete removal of the acetone. The mixture was then extracted with 100 cc. of benzene. The aqueous layer was found to contain 7.51 gms. (88.6%) of hydroquinone by ceric sulfate titration.

Example 4

The use of 42.5% $H_3PO_4$ with the components of an oxidation reaction mixture of di-isopropyl benzene, showing applicability to treatment of dihydroperoxide without removal from the oxidation reaction mixture in which it was made.

MATERIALS

| | |
|---|---|
| Phosphoric acid (85%) _____gms__ | 25 |
| Water _____gms__ | 25 |
| p-Di-isopropyl benzene _____gms__ | 10 |
| p-Di-isopropyl benzene monohydroperoxide__gms__ | 10 |
| p-Di-isopropyl benzene dihydroperoxide containing 8.43 gms. of the hydroperoxide_____gms__ | 10 |
| Chlorobenzene _____gms__ | 20 |
| Benzene _____ml__ | 25 |

PROCEDURE

The hydroperoxides were slurried with the chlorobenzene and di-isopropyl benzene and added in small portions to the acid at 75° C. in one hour. The acetone was substantially removed after each addition. After the last addition, the pot temperature was slowly raised to 100° C. to remove the last traces of acetone and the mixture cooled. Twenty-five ml. of benzene was added, the mixture was stirred for 5 minutes and the layers were separated. The aqueous layer was extracted twice with benzene and analyzed by ceric sulfate titration. It was found to contain 3.707 grams of hydroquinone (90% yield).

Example 5

The use of 42.5% $H_3PO_4$ with the dihydroperoxide of disecondary butyl benzene.

MATERIALS

| | |
|---|---|
| Phosphoric acid (85%) _____gms__ | 50 |
| Water _____gms__ | 50 |
| Crude disecondarybutyl benzene dihydroperoxide containing about 23.0 gms. of the dihydroperoxide _____gms__ | 35 |
| Acetone _____cc__ | 30 |

PROCEDURE

The acid and water were mixed and warmed to 75° C. The acetone solution of the dihydroperoxide was added in 30 minutes at 70–80° C., 50 cc. of water was added and the temperature was raised to 100° C. to distill the acetone and methyl ethyl ketone (reaction product). The mixture was then extracted with benzene. The aqueous layer was found to contain 8.29 gms. hydroquinone, which represented 81.6% yield assuming that all the peroxy oxygen present in the sample was present as the dihydroperoxide. The aqueous mixture was then extracted with di-isopropyl ketone and the solvent evaporated to give crude hydroquinone which melted at 169.3–171.3° C. after recrystallization from water.

*Example 6*

In this example a series of experiments was run reusing the acid filtered from each batch with no further treatment than concentration to its original volume.

MATERIALS FOR 1ST RUN

| | |
|---|---|
| Phosphoric acid (85%) _____gms__ | 25 |
| Water _____gms__ | 25 |
| Di-isopropyl benzene dihydroperoxide (16.7 gms. pure hydroperoxide) _____gms__ | 20 |
| Acetone _____cc__ | 65 |
| Toluene _____cc__ | 100 |

PROCEDURE

The dihydroperoxide dissolved in the acetone was added to the diluted acid at 70–72° C. in one hour. Fifteen cc. of water was added and distilled off slowly to remove all the acetone. The hot mixture was then extracted with 100 cc. of warm toluene and the aqueous layer cooled to cause the hydroquinone to crystallize. The product was filtered off and washed with 15 cc. of ice water.

MATERIALS FOR 2ND AND 3RD RUNS

Acid used in previous experiment.

| | |
|---|---|
| Crude di-isopropyl benzene dihydroperoxide__gms__ | 20 |
| Acetone _____cc__ | 65 |
| Toluene (could be the same used in previous experiments) _____cc__ | 100 |

PROCEDURE

The acid was concentrated to the original volume and the procedure used in the 1st run was repeated.

RESULTS OF THE EXPERIMENTS IN EXAMPLE 6

| Run No. | Grams Crude Hydroquinone | Percent Assay | Pure Hydroquinone | Percent Yield |
|---|---|---|---|---|
| 1 | 6.2 | 93.4 | 5.8 | 74 |
| 2 | 7.7 | 88 | 6.8 | 86.5 |
| 3 | 6.9 | 99.16 | 6.8 | 86.5 |

CRITICAL ASPECTS OF THE INVENTION

My invention can be operated over a fairly wide range of temperatures, the minimum temperature at which a rapid reaction is obtained being somewhat dependent upon the strength of the acid used. However, it is advantageous to use a somewhat elevated temperature at which the carbonyl compound will distill as formed. For example, acetone, which is formed when di-isopropyl benzene dihydroperoxide is used, is conveniently distilled at 70–75° C., this being the most advantageous temperature to use. In the case of disecondarybutyl benzene dihydroperoxide used in Example 5, the methyl ethyl ketone formed boils at 80° C., so it was not removed until the decomposition was complete. Temperatures higher than about 85° appear to have an adverse effect on the reaction.

The limits of solubility of hydroquinone in the acid at the reaction temperature appear to limit the amount of hydroquinone which can be prepared per batch in a given amount of catalyst. For the preferred concentrations of phosphoric acid this appears to be about 15% of the weight of the catalyst. (Example 6 used this maximum quantity.) This figure would be expected to be somewhat higher for lower concentrations of acid and lower for higher concentrations (about 6% for 85% $H_3PO_4$).

The introduction of the dihydroperoxide may be carried out in any convenient manner, provided that it is added to the acid at the same rate that it is decomposed. If the addition becomes too rapid, a violent reaction will take place. If acid is added to pure dihydroperoxide, the reaction may become explosive, and if acid is added to mixtures of dihydroperoxide usually encountered, the reaction will be uncontrollable.

My invention is designed to decompose dihydroperoxides in any of the admixtures which might be expected to be encountered in practice i. e., in aromatic or halogenated solvents, containing monohydroperoxides, unreacted dialkyl benzenes, and decomposition products of these materials. The dihydroperoxide may be isolated either alone or together with monohydroperoxide and dissolved in a different solvent for charging to the decomposition reactor. As stated previously, the various methods of isolating hydroquinone from acid mixtures are well known in the industry, and my invention as such is not limited to any of them. Other acids of phosphorous of equivalent strength which would not at the same time cause charring of the reactants or the products may be used.

I believe that the dihydroperoxides which are formed when the p-di-isopropyl benzene and p-disecondarybutyl benzene are oxidized by air in the presence of an aromatic solvent at temperatures between 100° C. and 140° C. have the structures shown below, and that they are decomposed by phosphoric acid to give hydroquinone and carbonyl compounds. I have shown this to be true by isolating and identifying the hydroquinone formed in the decomposition.

REACTION OF EXAMPLES 1–4 AND 6

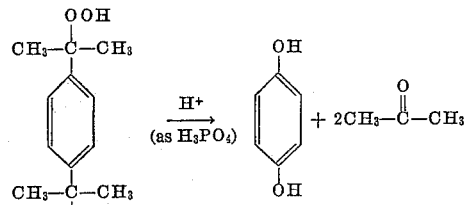

a,a,a',a'-Tetra methyl para-xylylene dihydroperoxide

REACTION OF EXAMPLE 5

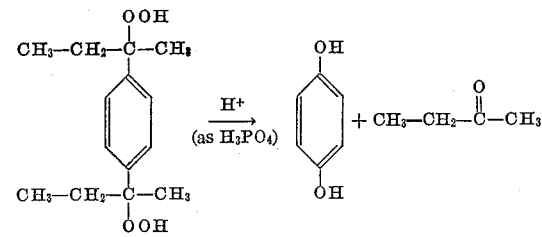

a,a'-Dimethyl, a, a'-diethyl para-xylylene dihydroperoxide

My invention introduces the use of a catalyst which will cause decomposition of the dihydroperoxides of para-dialkyl benzenes to form hydroquinone without causing charring and objectional coloration of the product. The yields are considerably higher than those cited for sulfuric acid, and temperature of reaction is not critical. The fact that the phosphoric acid may be reused without purification gives a low catalyst cost and prevents the considerable loss of hydroquinone which would occur due to solubility in the aqueous catalyst, if the catalyst were discarded after each operation.

The aqueous catalyst is of course superior costwise to any non-aqueous material such as the acetic-sulfuric acid medium suggested by Kharasch.

Other solvents which may be used for the addition of the dihydroperoxide to the decomposing medium include any inert solvent which would dissolve the dihydroperoxide and which could be completely removed from the reaction mixture. These would include methyl and ethyl alcohols, acetone, methyl ethyl ketone and certain warm aromatic solvents—chloro and dichlorobenzene, bromobenzene, toluene, xylene, cumene, di-isopropylbenzene, butyl and dibutyl benzenes. (Benzene would not be desirable with di-isopropylbenzene dihydroperoxide because of the low solubility at the boiling point.)

In order to get practical conversions to the dihydroperoxide, it is necessary to carry on the oxidation until 80% or better of the hydrocarbon is oxidized, with the result that appreciable amounts of decomposition products also appear in the product. Any practical process for the production of hydroquinone by the oxidation of di-isopropylbenzene must make provision for isolating the product from these impurities. In the process of my invention, the isopropyl phenol and other impurities are extracted from the aqueous solution of hydroquinone by an aromatic solvent in which hydroquinone is essentially insoluble. Such solvents include benzene, toluene, xylene, cumene, di-isopropylbenzene, dibutyl benzenes and halogenated benzenes.

I claim:

1. A process for preparing hydroquinonce comprising slowly adding a solution of a dihydroperoxide of a p-dialkyl benzene in which the alkyl groups have the formula

R and R' being lower alkyl groups, in an inert organic solvent of high solubility for the hydroperoxide and selected from the group consisting of lower aliphatic alcohols and ketones, chlorinated benzenes, brominated benzenes, and alkyl benzenes, to an aqueous solution of phosphoric acid of about 10–85% concentration and at a temperature of about 40–75° C., the addition being carried out only as fast as the dihydroperoxide decomposes, then adding to the reaction mixture additional water as required for separation of the hydroquinone, raising the temperature of the mixture to about 100° C. to distill off ketone formed during the decomposition of the dihydroperoxide, adding to the residue from the distillation an extraction agent for removing organic impurities and co-products, said agent being an aromatic solvent in which hydroquinone is essentially insoluble, and cooling the hot aqueous phosphoric acid after extraction whereby an organic layer and a hydroquinone containing aqueous layer are obtained.

2. A process according to claim 1, wherein the dihydroperoxide is present as a component of a reaction mixture from the autoxidation of said p-dialkyl benzene.

3. A process according to claim 1, wherein the hydroperoxide is p-diisopropyl benzene dihydroperoxide.

4. A process according to claim 1, wherein the hydroperoxide is p-disecondarybutyl dihydroperoxide.

5. A process according to claim 1, wherein the solvent for the dihydroperoxide is acetone.

6. A process according to claim 1, wherein the solvent for the dihydroperoxide is chlorobenzene.

7. A process according to claim 1, wherein the hydroquinone is crystallized out of the aqueous layer and the remaining aqueous material is reused in the phosphoric acid solution for decomposing further dihydroperoxide.

8. A process according to claim 1, wherein the extraction step is carried out at elevated temperature when the amount of hydroquinone formed is 10–17% of the weight of the phosphoric acid used.

9. A process according to claim 1, wherein the p-dialkyl benzene is p-diisopropyl benzene, the reaction mixture being maintained at 70–75° C. during addition of the dihydroperoxide, whereby acetone produced is distilled off as formed.

10. A process according to claim 1, wherein the extraction solvent is benzene.

11. A process according to claim 1, wherein the extraction solvent is toluene.

12. A process for preparing hydroquinone comprising adding an acetone solution of p-di-isopropyl benzene dihydroperoxide slowly to an aqueous solution of phosphoric acid of about 10–85% concentration and at a temperature of about 40–75° C., the addition being carried out only as fast as the dihydroperoxide decomposes, agitating the reaction mixture for a short period of time after the reaction is complete, adding additional water to the reaction mixture, raising the temperature of the mixture to about 95° C. to distill off acetone, extracting the residue from the distillation with benzene, and separating the extract into an organic layer and a hydroquinone containing aqueous layer.

References Cited in the file of this patent

UNITED STATES PATENTS

| 2,628,983 | Aller et al. | Feb. 17, 1953 |
| 2,663,735 | Filar et al. | Dec. 22, 1953 |

FOREIGN PATENTS

| 484,328 | Canada | June 24, 1952 |